United States Patent [19]

Duncan et al.

[11] 4,406,570
[45] Sep. 27, 1983

[54] MATERIALS HANDLING SYSTEM

[75] Inventors: L. Scot Duncan, North Field; Richard W. Germuska, Brunswick; Stephen L. Kral, Garfield Heights; Robert R. Lasecki, Eastlake; Michael W. Riley, Strongsville, all of Ohio

[73] Assignee: Burlington Industries, Inc., Greenboro, N.C.

[21] Appl. No.: 192,549

[22] Filed: Sep. 30, 1980

[51] Int. Cl.³ .............................................. B65G 1/04
[52] U.S. Cl. .................................... 414/282; 414/911
[58] Field of Search .............. 414/277, 281, 282, 745, 414/911

[56] References Cited

U.S. PATENT DOCUMENTS

| | | |
|---|---|---|
| 732,884 | 7/1903 | Normandin . |
| 1,802,010 | 4/1931 | Fitch . |
| 1,832,000 | 11/1931 | Caesar et al. . |
| 1,949,964 | 3/1934 | Keller et al. . |
| 2,226,294 | 12/1940 | Erickson . |
| 2,335,601 | 11/1943 | Mount . |
| 2,416,763 | 3/1947 | Lynch . |
| 2,508,661 | 5/1950 | Campbell . |
| 2,790,567 | 4/1957 | Rockhill . |
| 2,798,267 | 7/1957 | Anderson . |
| 3,075,656 | 1/1963 | Pearne ............................ 414/282 X |
| 3,161,284 | 12/1964 | Ashworth . |
| 3,173,557 | 3/1965 | Eliassen . |
| 3,175,722 | 3/1965 | Paulssen ............................ 414/277 |
| 3,231,100 | 1/1966 | Faeber . |
| 3,502,320 | 3/1970 | Scordato . |
| 3,601,270 | 8/1971 | Martin . |
| 3,664,518 | 5/1972 | Petros et al. . |
| 3,719,270 | 3/1973 | Budris et al. . |
| 4,050,571 | 9/1977 | Kushigian . |
| 4,268,207 | 5/1981 | Pipes .................................. 414/277 |

OTHER PUBLICATIONS

Kenway Unit Load (Sales Brochure), 1978.

Primary Examiner—Robert G. Sheridan
Attorney, Agent, or Firm—Cushman, Darby & Cushman

[57] ABSTRACT

An improved material handling and storage system for receiving articles in the form of long rolls or boxes and for storing them in predetermined bin areas. The system includes novel support and transfer assemblies for moving the articles and also transfer loading and packaging stations for respectively initially receiving the articles and loading them on the transfer assemblies prior to storage and for packaging the articles following their removal from their storage bin area.

4 Claims, 6 Drawing Figures

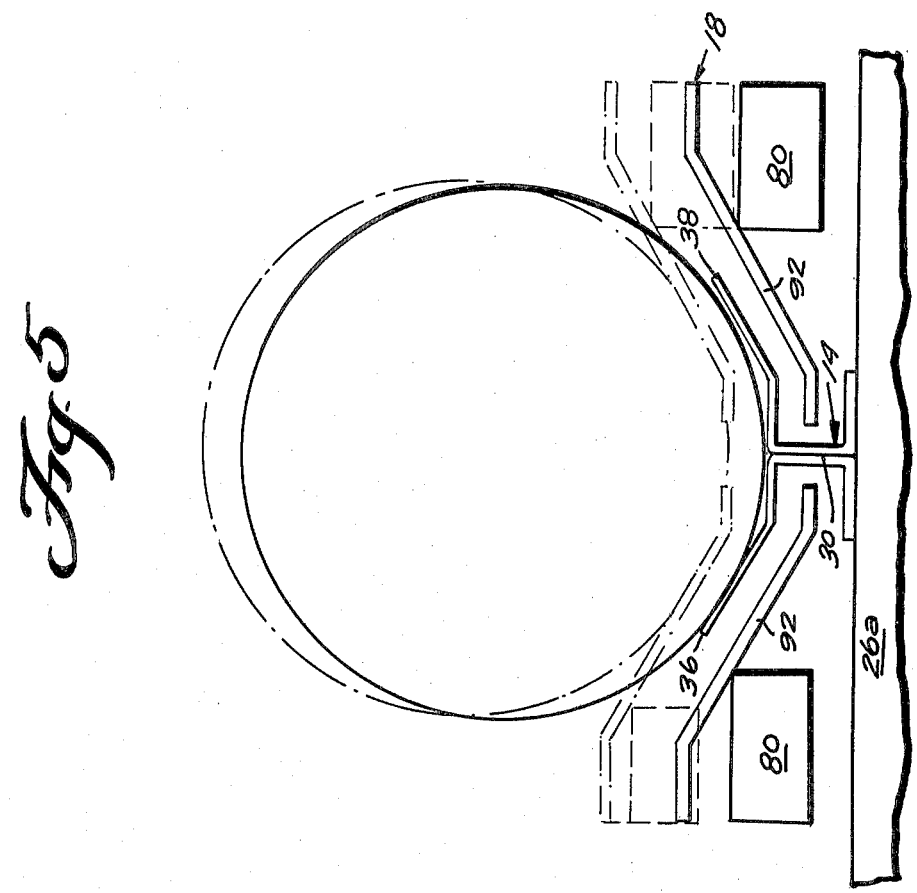
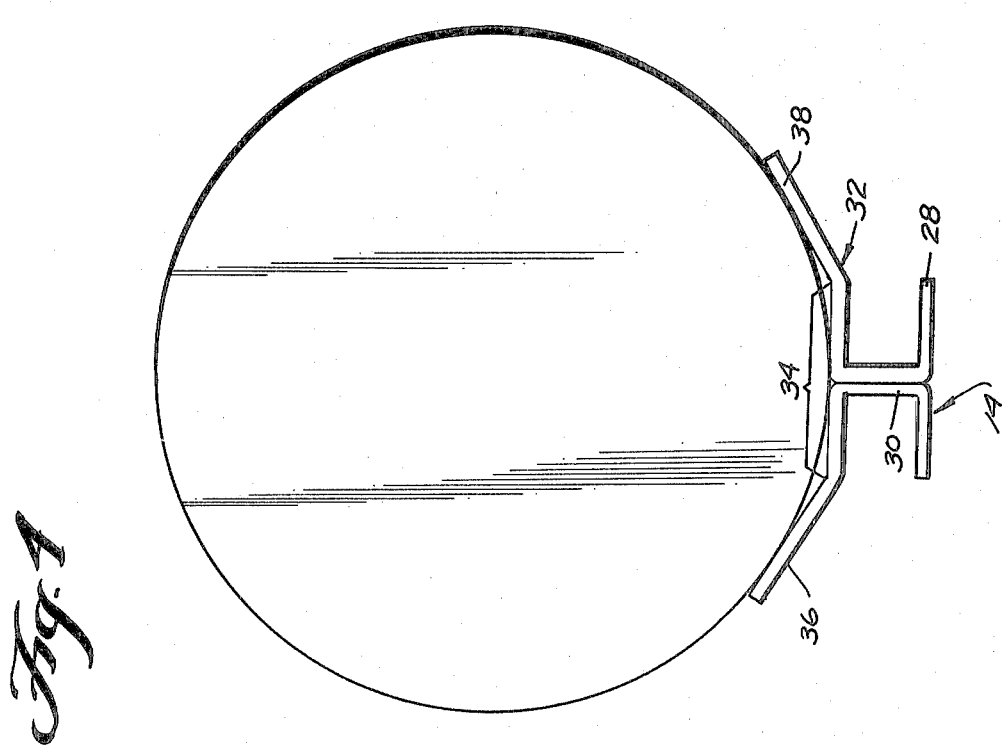

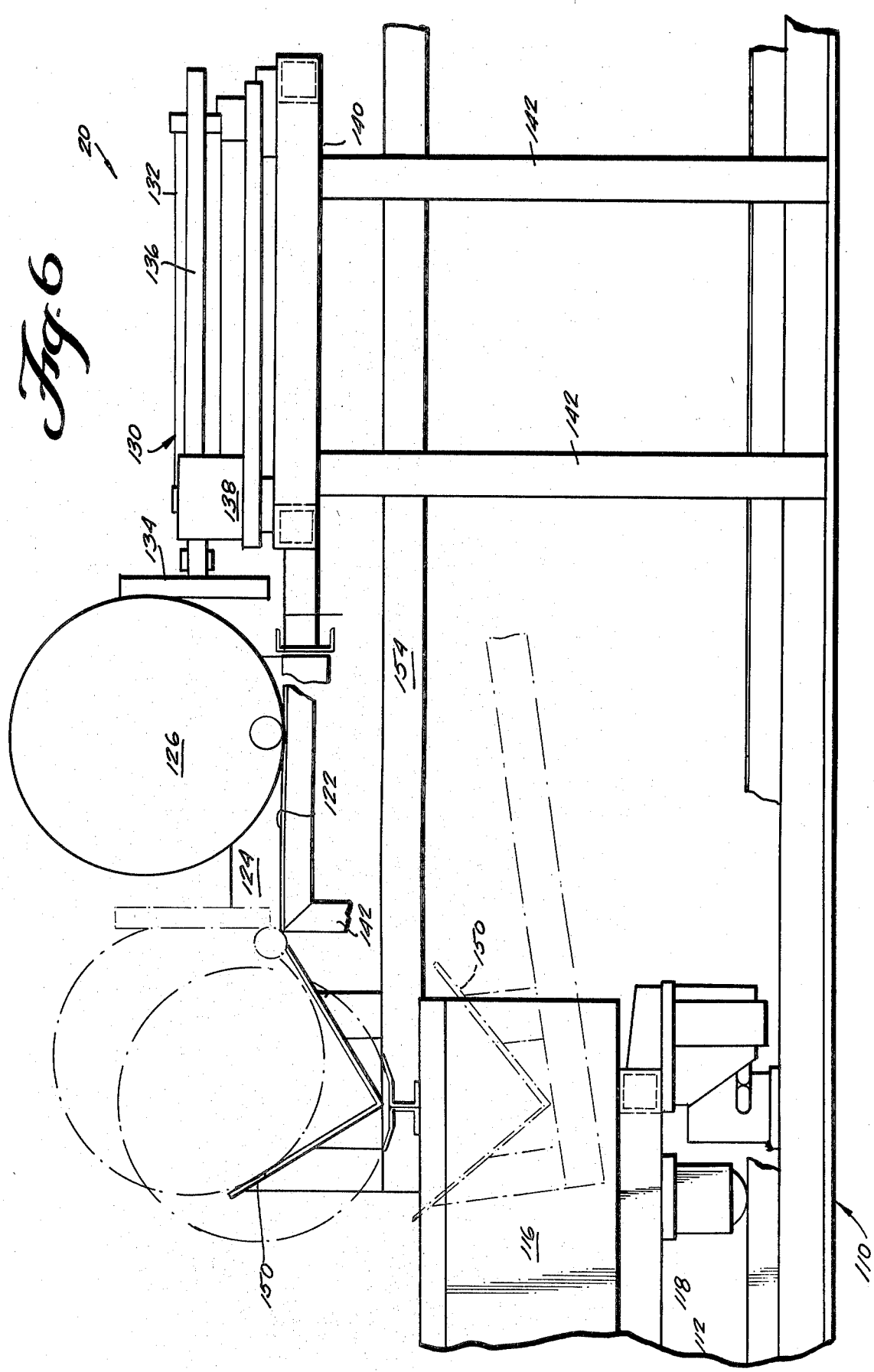

MATERIALS HANDLING SYSTEM

BACKGROUND OF THE PRESENT INVENTION

There are presently many known systems in use for storing a variety of types of packages of production items. Many times such items constitute rolls, boxes or some other shape and the present invention can handle this variety of goods. These vary from systems that include relatively low shelving where items can be placed and removed by hand. Placement of items on the shelves can be according to size, model numbers or some other goods description. Other systems involve relatively complex bin or shelving structures where a large number of goods can be stored. In such arrangements, the goods are frequently placed on pallets and the pallets with the goods thereon are thereafter placed within the structure by forklift truck type devices. Still other types of storage systems involve relatively high shelving structures where the device for moving articles to and from the storage area is in the form of an elevator. In some instances, this elevator structure includes a device similar to the tines of a forklift truck that can cooperate with a pallet in order to place and remove articles from the storage structure or a flat plate could be used with the items being stored or retrieved.

In most of these known storage and retrieval systems, the goods being stored and retrieved need to be placed on some type of support that allows them to be moved in and out of the storage area. This support usually takes the form of some type of pallet structure. Thus, it is necessary when transferring or moving the goods, that a pallet structure be used and indeed moved with the goods.

Applicants are aware of a number of prior art patents that relate to various aspects of the present invention insofar as it includes material handling, conveyors, work piece movement and transfer functions. A first series of patents deals with elevator structures or inter-digitating finger arrangements wherein two opposing groups of fingers can move through each other in order to lift or move articles. These patents include Normandin, U.S. Pat. No. 732,884, Caesar et al, U.S. Pat. No. 1,832,000, Faeber, U.S. Pat. No. 3,231,100, and Martin, Sr., U.S. Pat. No. 3,601,270. Devices for transporting objects by being moved around the object and thereafter lifting it include Fitch, U.S. Pat. No. 1,802,010, and Campbell, U.S. Pat. No. 2,508,661. Devices for moving pallets or otherwise involving pallets are disclosed in Erickson, U.S. Pat. No. 2,226,294, and Anderson, U.S. Pat. No. 2,798,267. Scordato, U.S. Pat. No. 3,502,320, discloses a device for lifting a roll of cloth by arms which engage a structure at each end while conveyor mechanisms or systems are shown in Keller et al, U.S. Pat. No. 1,949,964, Rockhill, U.S. Pat. No. 2,790,567, and Eliassen, U.S. Pat. No. 3,173,557.

Another series of patents that show devices for otherwise transferring work pieces of a variety of types include Mount, U.S. Pat. No. 2,335,601, Lynch, U.S. Pat. No. 2,416,763, Ashworth, U.S. Pat. No. 3,161,284, Petros et al, U.S. Pat. No. 3,664,518, Budris et al, U.S. Pat. No. 3,719,270 and Kushigian, U.S. Pat. No. 4,050,571.

None of these patents, however, disclose the particular handling and storage system set forth and described herein. In particular, none describe the particular bin and support structures contemplated by the present invention or the particular transport and transfer apparatus as are disclosed and used herein. Further, none suggest or disclose the overall concept for dealing with either rolled or boxed materials, as does the present invention, including the way in which such goods are easily and correctly deposited on and retrieved from a bin support structure.

SUMMARY OF THE PRESENT INVENTION

We have found a way to not only support and transfer a variety of types of packages in a more secure and economical fashion, but have accomplished that result in a way which can make use of the bin structure more efficient. At the same time, the costs of that bin structure are reduced, space for storage is more efficiently used and the necessity for employing pallets is also omitted so that no pallet needs to be moved with the goods thereby making the deposit and removal of packages or articles a simpler and less expensive task to perform.

The storage and retrieval system of the present invention is comprised of a bin or support structure in the form of a plurality of open areas each of which includes a plurality of individual article support devices or cradles located in a spaced apart fashion along both the front and rear edges of each of the bins. This allows the bin structure to be formed in an essentially open frame work or grid type system. Goods will be stacked only one article high on the cradles so that use of space is also made more economic and allows retrieval to be automatically controlled.

Also, included is a transport device for moving one or more articles in both vertical and horizontal directions so that when a plurality of bins are formed in a vertical array, it will be easy to place the transport device at a predetermined position adjacent a predetermined bin. Transfer means are included as a portion of the transport device for both depositing articles in the bin and removing articles therefrom as well as for receiving rolls or articles from a loading station and depositing them at a packing station.

The transfer means is designed for interdigitating with pairs of the individual article support devices or cradles in order to accomplish both the depositing and removal operations. As is indicated above, the apparatus includes a staging or loading station in which the transfer means are loaded with the articles to be stored and an input conveyor for bringing articles to the loading station. The system also includes a packaging station for receiving articles retrieved from the support bin structure and for thereafter packaging those retrieved articles in preparation for shipment or removal from the storage system area. In addition, the system according to the present invention, makes use of control apparatus for controlling the operation of the system and for determining both, initially, during depositing of the articles in the bin structure, and subsequently during retrieval, the location of any particular individual or group of articles.

DETAILED DESCRIPTION OF THE DRAWINGS

Other objects, features and characteristics of the present invention as well as the methods of operation and functioning of related elements of the structure recited herein and to the combination of parts and economies of their manufacture will all become more apparent upon consideration of the following description and the appended claims with reference to the accompanying drawings, all of which form a part of this specification, wherein like reference numerals designate corresponding parts in the various Figures.

In the drawings:

FIG. 4 is an end elevation showing the end of a roll supported on the fixed support device;

FIG. 5 is a diagrammatic end elevation showing the various positions of the transfer assembly in depositing or removing articles from the fixed supports; and FIG. 6 is a side elevational view of the loading assembly.

DETAILED DESCRIPTION OF THE PREFERRED EXEMPLARY EMBODIMENT

Figure 1:
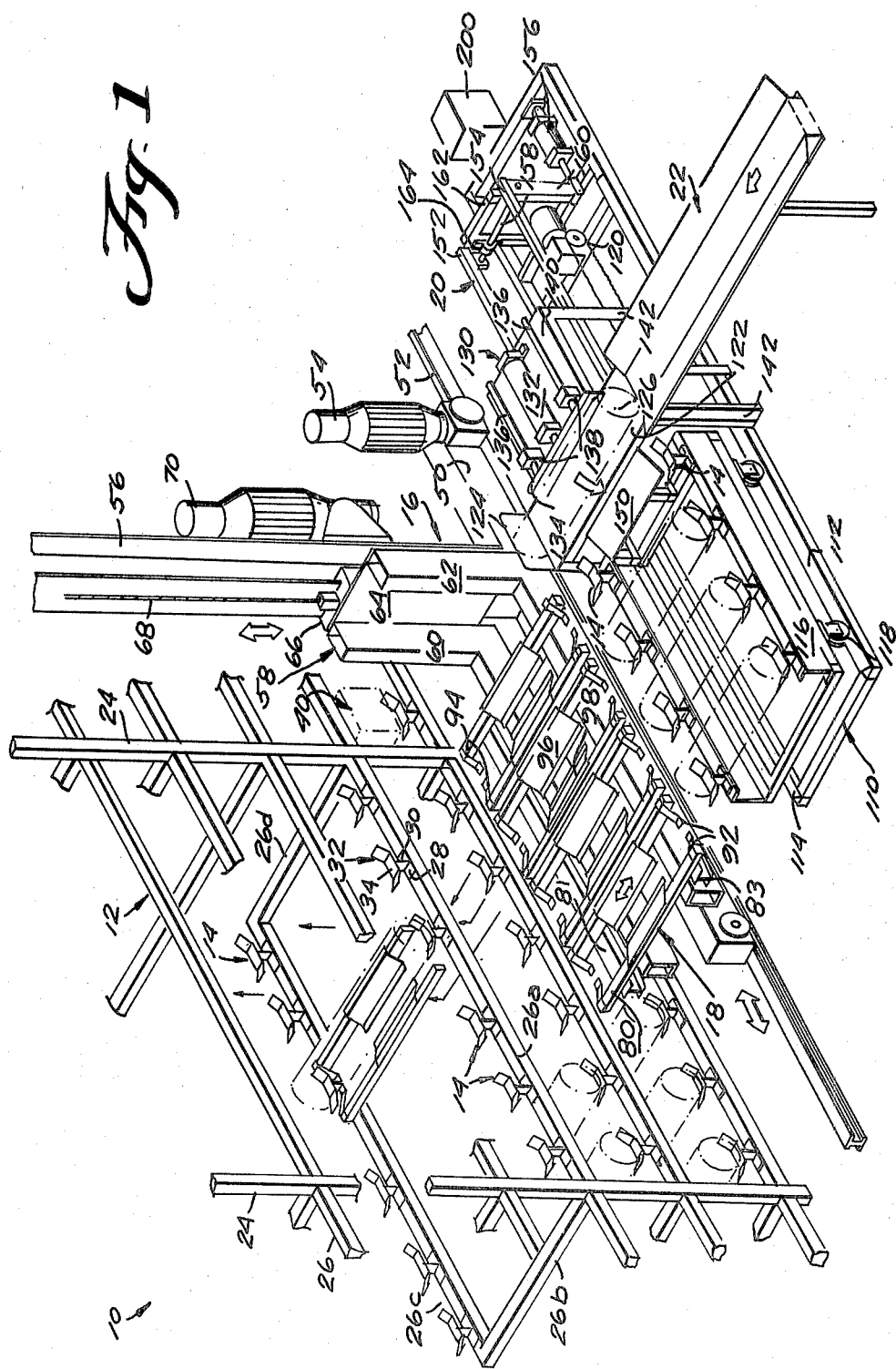
FIG. 1 is a diagrammatic, perspective view of the main bin support structure together with the transport and transfer means, the loading and input conveyor devices.
Figure 3:
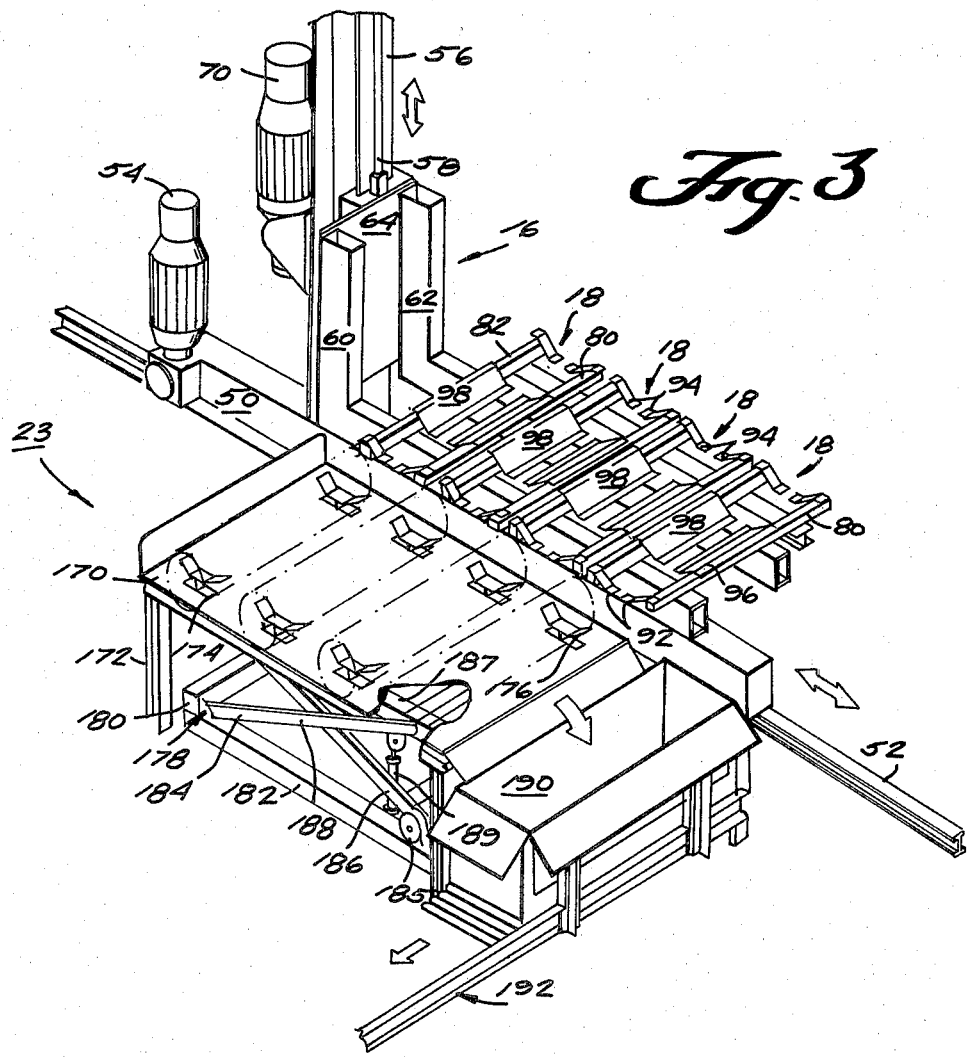
FIG. 3 is a diagrammatic, perspective view of the transport and transfer devices together with the packing station.

Turning now to FIGS. 1 and 3, the preferred exemplary embodiment is shown at 10 and is comprised of a plurality of sub-assemblies including an open bin system 12, individual article supports 14 located at various points throughout the system, transport and transfer sub-assemblies, respectively indicated at 16 and 18, a loading station 20, an input assembly 22 and a packaging station 23.

Bin structure 12 is comprised of a plurality of vertical and horizontal beams 24 and 26, respectively, which are welded or otherwise secured together to form an essentially integral storage device. As shown in FIG. 1, one complete section is shown and is specifically comprised of horizontal beams 26a–26d. A plurality of such sections will be formed together to make an open rack structure that is about 29 feet high and about 150 feet long. Each individual bin can be about 96 inches long by about 18 to about 30 inches in height depending upon the size of the article (roll, box or other item) being handled and stored.

A plurality of fixed article support devices 14, as shown in FIGS. 1, 4 and 5, are connected to the front and rear beams 26a and 26c. Each such device is comprised of a foot portion 28, a vertical supporting spline 30 and an upper support plate, generally indicated at 32, which is comprised of a horizontal section 34 and two side wings 36 and 38 which are inclined upwardly from horizontal portion 34 at an angle of about 30°. As shown in FIG. 1, there are six pairs of these fixed supports 14 located in each bin and they are arranged so that they can either support a roll as shown or a box as indicated at 40.

The transport assembly, generally indicated at 16, serves to support a number of transfer or shuttle assemblies 18 and serves to move them both vertically and horizontally with respect to the bin structure 12. Transport assembly 16 is comprised of a carriage assembly 50 which is mounted on rail 52 and is moved horizontally by drive means 54. While it is preferred to employ one rail 52 on the floor of the building and another rail adjacent the ceiling or the top of the bin structure to support the transport assembly 16, it should be understood that two rails 52 and two carriage units could be employed as well.

Figure 2:
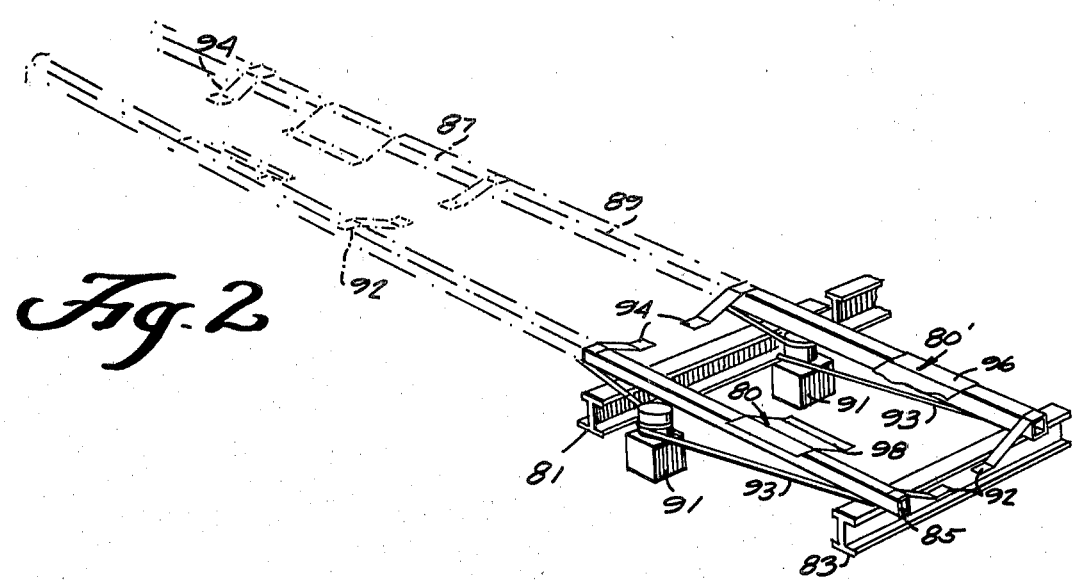
FIG. 2 is a diagrammatic view of the transfer or shuttle device shown in FIG. 1 in its normal and extended positions.

Carriage 50 can traverse horizontally along the rails and the bin structure so that it can be positioned horizontally with respect to any particular bin or portion thereof. Transport assembly 16 is also provided with a vertically extending tower structure 56 secured to carriage 50 so that together they form an L-shaped structure. Slidably connected to this tower structure or beam 56 is an elevator assembly 58 which includes two L-shaped support members 60 and 62 which are respectively mounted to a support plate 64 by any suitable means such as bolts or welding. Support plate 64 is itself mounted to a slide block 66 which is connected to drive means 70 by cable 68 with the drive means 70 serving to raise and lower the whole elevator assembly 58. The transfer or shuttle assemblies 18 extend transversely across L-shaped support members 60 and 62. Each is respectively comprised of two movable bar units 80 and 80' that operate in the fashion of a triple track drawer support system in order to index away from both sides of the elevator assembly 58. As shown in FIG. 2, one of the three tracks 85 is secured to I-beam segments 81 and 83 which are themselves secured to the extension of L-shaped arms 60 and 62 by hydraulic cylinders (not shown) and are therefore movable upwardly away from their normal resting position adjacent the L-shaped arms 60 and 62. The two other movable arms 87 and 89 are connected to the fixed arm 85. Drive motors 91 and 91' are mounted to the inside of L-shaped arm 60, one for each bar unit, and through cables 93 and 93' and a pulley system move bar units 80 and 80' to the one side of elevator assembly 58 or the other depending upon the direction the motors are operated; thus, each assembly 18 is independently operable.

Connected to each of the movable bars 80 and 80' are a plurality of pairs of fingers with pair 92 being located at one end while a second pair 94 are located at the opposing end. If desired, additional support fingers or plates can also extend inwardly from each of the movable bars 80 and 80' and such additional support plates are shown at 96 and 98 in FIG. 1. Such additional support plates provide additional support for the center of the items being transferred and make the transfer of the articles a steadier and more secure operation. It should be noted that each of the pairs of fingers 92 and 94 and support plates 96 and 98 extend only a predetermined distance inwardly away from the movable bars 80 and 80' so that an opening or gap is defined between each of them along the length of each transfer assembly 18. As shown in FIG. 1, in phantom, within the single bin structure that is shown, one of the transferred assemblies is shown in its inward position wherein each of the fingers or support plates lies within the area defined between the front and rear individual item supports 14. As will become clear hereafter, the gap between the fingers or the support plates within each of the transfer assemblies is needed in order that the transfer assembly can move past the vertical support spline 30.

With reference again to FIGS. 1 and 6, the loading or staging area assembly 20 can be positioned at a convenient point with respect to the transport means 16 and is located so as to receive the rolls or boxes from the input conveyor 22. The loading assembly 20 is comprised of a bottom rail structure 110 and is comprised of rails 112 and 114 upon which a wagon or carriage assembly 116 is movably positioned. The wagon 116 is provided with wheels 118 for engaging rails 112 and 114 and serves to support a plurality of support devices or cradles 14 similar to those used in the bin structure 12. This carriage can be moved along rails 112 and 114 by means of a chain drive mechanism 120 so that the pairs of support devices 14 can be sequentially moved past or through a receiving position. Conveyor 22 deposits rolls or boxes on the loading apparatus and as shown in FIG. 1, a roll of carpeting or textile material has been deposited on a support platform or doffing table 122, which is provided with a stop plate 124 at the end opposite conveyor 22 to correctly position the item. Support platform 122 is positioned above the space above rails 112 and 114 so that carriage 116 can slide thereunder. As shown, in phantom in FIG. 1, three rolls of textile material have already been deposited on carriage 116 and the last roll, indicated at 126, is about to be deposited on the last pair of supports or cradles 14. A pushing assembly 130 is used to push the rolls of cloth from platform 122 onto carriage 116 and the push assembly 130 is comprised of a drive cylinder 132, a push plate 134 which is connected to the drive rod of cylinder 132 and is guided in its movement by guide rods 136, which respectively slide in bushings 138. Pushing assembly 130 is shown as being mounted to a stand 140 which can be connected to support platform 122, all of which are supported by a plurality of legs 142. In order to assure the proper and gentle positioning of articles on each of the pairs of supports or cradles 14, located on carriage 116, a V-shaped guide 150 is positioned at the front edge of doffing table 122 and between the pairs of support devices 14. Guide 150 is connected to a pair of arms 152 and 154 which can be pivoted between raised and lowered positions, as shown in phantom in FIG. 6, by means of a drive cylinder 156. Arms 152 and 154 extend beneath support plate or doffing table 122 and the rear portion of each is connected to a rod 185 which in turn is connected to a crank arm 160, the latter being connected to drive rod of cylinder 156. Rod 158 is pivotally secured within an upstanding frame 162 by means of pillow blocks 164 so that rod 158 can rotate. As the cylinder 156 is actuated so that the drive rod can be extended and retracted, crank arm 160 will be moved in a clockwise and counterclockwise direction, respectively, which will accordingly raise and lower the V-shaped guide 150. As the article is pushed off table 112, it will be received within the V-shaped guide 150 and thereafter gently lowered onto a pair of supports or cradles 14.

Once carriage 116 is fully loaded and is in the position shown in FIG. 1, transfer assemblies 18 can be positioned adjacent carriage 116 by transport assembly 16 so that the rolls or articles can be transferred from carriage 116 onto each of the transfer assemblies 18 in a manner similar to that in which the articles are removed from the bin structure 12. This will be discussed in greater detail hereafter.

Turning our attention next to FIG. 3, the packaging assembly 23 is shown as being comprised of a support platform 170 which is supported by a plurality of legs 172. Platform 170 is provided with a plurality of openings 174 through which pairs of support devices or cradles 176 can pass. Support devices 176 are similar to support devices or cradles 14, shown in FIGS. 1 and 4, except that each pair is connected to an elevator assembly, generally indicated at 178, that can raise and lower each pair simultaneously through openings 174. The elevator assembly 178 is comprised of a fixed rear beam 180, a pair of side rails 182 and two pairs of arms 184 and 186. One end of arms 184 are pivotally fixed to fixed beam 180 whereas the other end is connected to rollers (not shown) which engage the front portion of the bottom edges of an upper frame 187 to which support devices 176 are attached. One end of arms 186 are connected to wheels 185 which ride along rails 182 while the opposite ends are pivotally attached to the opposite or rear portion of frame 187. Arms 184 and 186 on each side of assembly 178 are pivotally connected together at their centers, as at 188. A hydraulic actuator 189 can be used to raise and lower assembly 178, and this also raises and lowers support devices 176 through openings 174. After support devices 176 are raised, one or more articles can be transferred by one or more transfer assemblies 18. Following transfer of the articles onto the packaging assembly 23, the elevator assembly 178 can be lowered thereby lowering supports 176 through openings 174 so that the articles will become supported by platform 170. This platform can be slanted, in which case the articles, such as the rolls, can roll into a box 190 which now can be closed and removed by an exit conveyor 192. Table 170 could also be horizontal allowing an operator to manually roll or move the articles deposited thereon into an appropriate shipping container. It should also be understood that if boxes are used, a push assembly similar to that shown at 130 in FIG. 1 could be used to push the boxes into a larger packing box or into a position so that they rest on an exit conveyor 192 which could also be raised to the height of platform 170.

OPERATION OF THE PRESENT INVENTION

After articles, such as boxes or rolls of textile material, either in the form of fabric or carpet, have been fully processed and formed into rolls of a proper diameter, which can vary from 12 inches to 24 or more inches, or placed in a box, the rolls can be placed on the input conveyor 22 and fed to the loading assembly 20. The rolls or boxes can be sequentially loaded on carriage 116 by being sequentially pushed into the V-shaped guide 150 which when actuated, will deposit or lower each article onto supports or cradles 14. By sequentially moving carriage 116 beneath the doffing table 122, successive pairs of cradles 14 will be loaded.

When the carriage 116 is fully loaded, transfer assemblies 18 can be positioned by the transport assembly 16 into a proper position adjacent one side of carriage 116. Once the transfer assemblies 18 are in that position, they will be moved as shown in FIG. 1, to the right so that finger pairs 92 and 94 together with supports 96 and 98 will be positioned between the pair of supports 14 on carriage 116 and beneath rolls 126. Reference to FIG. 5 will show the relative position of the fingers 92, or 94, as well as supports 96 and 98 versus supports 14. In particular, FIG. 5 shows fingers 92 in full line in their indexed position below members 36 and 38 and on both sides of spline 30 of support 14 and the full line representation of the roll shows it resting on support 14. The phantom lines show the position of the roll after its lifted upwardly off support 14 and supported by fingers 92 of the transfer assembly 18. The removal of articles from carriage 116 is accomplished by initially positioning transport assembly 16 such that fingers 92 are positioned horizontally beneath the upper portion 32 of support devices 14. In this position, the splines 30 of the support device 14 will be intersected by the slot defined between the fingers down the length of each of the transfer assemblies 18. Thereafter, transfer assemblies 18 can be fully indexed to a position between the pairs of supports 14, beneath the rolls and beneath the main support portion 32 of support devices 14. With transfer assemblies 18 in this position, one or more of the transfer assemblies 18 can be raised either by raising the elevator 58 or by hydraulically raising the appropriate I-beams 83 away from L-shaped arms 60 and 62. Either method will raise the transfer assemblies 18 in between support devices 14 so they intersect the bottom of the central portion of each of the articles. Raising of transfer assemblies 18 will continue until the articles are lifted clear of support devices 14 and the transfer assemblies 18 also lie thereabove. When the transfer assemblies 18 have moved to that position, further vertical movement will cease and the transfer assemblies 18 will be indexed back to their normal position over L-shaped arms 60 and 62. It should be kept in mind that each end of the article now on the transfer assemblies 18 will extend outwardly beyond the ends of assemblies 18 so that those ends can be subsequently intercepted and supported by other pairs of supports or cradles 14. Thereafter the control device 200 can be fed with coded information with respect to each of the rolls including the type of material, its grade designation, color or pattern information or other data that would be helpful in later finding a particular roll of cloth within the bin structure. The control device 200 can be a programmable minicomputer such as a Sperry Univac V77 type programmable minicomputer. Once that information is stored, the control device 200 will be able to determine empty bin space and will assign a particular position within the bin to each of the rolls just transferred. In order to accomplish that, the transport assembly 16 can be moved horizontally and vertically until the article or articles are adjacent the predetermined bin area assigned to them and so that transfer assemblies 18 are adjacent their respective support devices 14 so that loading of the bin can proceed. The necessary segmented pairs of I-beams 81 and 83 can again be raised if they were not kept in their raised position so that the necessary transfer assembly 18 of the article or articles being deposited will be raised above the plane defined by portion 32 of supports or cradles 14. Thus, fingers 94 will be positioned adjacent but spaced vertically above support devices 14. Thereafter transfer assemblies 18 will be indexed inwardly so that they are positioned above the plane of those supports and into a position centered therebetween. With the transfer assemblies 18 in that position, the I-beams 81 and 83 can be lowered so that the ends of the articles being deposited will be intercepted and supported by support devices 14. Lowering of the transfer assemblies 18 will be only enough to move the support fingers below the support portion 32 of support devices 14 and when in that position, transfer assemblies 18 will be indexed out from beneath support devices 14 and back again to their normal position.

While the invention has been described in connection with what is presently considered to be the most practical and preferred embodiment, it is to be understood that the invention is not to be limited to the disclosed embodiment but on the ontrary, is intended to cover various modifications and equivalent arrangements included with the spirit and scope of the appended claims, which scope is to be accorded the broadest interpretation so as to encompass all such modifications and equivalent structures.

What is claimed is:

1. A storage system for handling, storing and retrieving articles including a plurality of storage bins, transport means for moving the articles to and from the storage bins and control means for controlling the operation of said transport means wherein the storage bins are formed from at least front and rear skeletal frame members and sets of support members, each set comprised at least of front and rear support members, respectively, mounted to said front and rear frame members, each of said support members including a vertically extending supporting spine having one end mounted to a respective frame member and a support element connected to the other end of said spine and extending generally transverse to said spine, said transport means includes transfer means for transferring the articles between said bins and said transport means further including at least one horizontally and vertically movable carriage assembly having at least two spaced apart horizontal arms each having a plurality of inwardly extending support fingers for engaging said materials, said support fingers being spaced apart along said arms so that they interdigitate with at least said front and rear support members when said articles are moved to and from said storage bins.

2. A storage system as in claim 1 wherein said system further includes loading means for loading said transport means and article feeding means for at least sequentially feeding articles from a collection point to said loading means.

3. A storage system as in claim 1 wherein each of said plurality of bins includes a plurality of said sets of support members and said transfer means includes a plurality of carriage assemblies.

4. A storage system as in claim 1 or 3 wherein said inwardly extending support fingers are comprised of two opposing pairs, each pair positioned respectively at opposed ends of said horizontal arms.

* * * * *